US005391299A

United States Patent [19]

Masuda et al.

[11] Patent Number: 5,391,299

[45] Date of Patent: Feb. 21, 1995

[54] PROCESS FOR PRODUCTION OF STARCH SUGARS

[75] Inventors: Takayuki Masuda, Inzaimachi; Kuniaki Kawano, Matsudo; Isamu Miyawaki, Kamakura, all of Japan

[73] Assignee: Organo Corporation, Tokyo, Japan

[21] Appl. No.: 193,865

[22] Filed: Feb. 9, 1994

[30] Foreign Application Priority Data

Feb. 12, 1993 [JP] Japan ..................... 4-047515

[51] Int. Cl.$^{6}$ ..................... B01D 15/08

[52] U.S. Cl. ..................... 210/659; 210/198.2; 127/46.1; 127/46.2

[58] Field of Search ..................... 127/30, 46.1, 46.2, 127/46.3, 55; 210/635, 656, 659, 198.2

[56] References Cited

U.S. PATENT DOCUMENTS

| | | | |
|---|---|---|---|
| 4,498,991 | 2/1985 | Orokar | 210/659 |
| 4,970,002 | 11/1990 | Ando | 210/659 |
| 4,990,259 | 2/1991 | Kearney | 210/659 |
| 5,064,539 | 11/1991 | Tanimura | 210/198.2 |
| 5,093,004 | 3/1992 | Hotier | 210/659 |
| 5,102,553 | 4/1992 | Kearney | 210/659 |
| 5,114,590 | 5/1992 | Hotier | 210/659 |
| 5,122,275 | 6/1992 | Rasche | 210/659 |
| 5,126,055 | 6/1992 | Yamashita | 210/659 |
| 5,198,120 | 3/1993 | Masuda | 210/659 |
| 5,223,143 | 6/1993 | Masuda | 210/659 |

FOREIGN PATENT DOCUMENTS

| | | | |
|---|---|---|---|
| 62-51120 | 10/1987 | Japan | 210/198.2 |
| 383991 | 4/1991 | Japan | 210/198.2 |

*Primary Examiner*—Ernest G. Therkorn
*Attorney, Agent, or Firm*—Oblon, Spivak, McClelland, Maier & Neustadt

[57] ABSTRACT

The present invention provides a process for production of starch sugars, wherein starch is subjected to liquefaction and saccharification to prepare a mixture containing 10–50% by weight, based on the total solid content, of glucose and 30–50% by weight, also based on the total solid content, of maltose and the mixture is concentrated so as to have a total solid content of 40–70% by weight; and the resulting mixture is subjected to component separation using a chromatographic separator of simulated moving bed type capable of fractionating the mixture into at least three fractions, to produce a glucose fraction with a glucose purity of at least 97% by weight, a maltose fraction with a maltose purity of at least 80% by weight and a high-purity oligosaccharide fraction at a high efficiency in one operation. In the process, no strict control is required for the enzymatic reactions taking place in the liquefaction and saccharification of starch, and all the fractions obtained by the chromatographic fractionation can be made into marketable products.

8 Claims, 3 Drawing Sheets

PROCESS FOR PRODUCTION OF STARCH SUGARS

BACKGROUND OF THE INVENTION

1. Field of the Invention

The present invention relates to a process for production of starch sugars wherein a high-purity glucose product and a high-purity maltose product are produced from a starch. More particularly, the present invention relates to a process for producing starch sugars at high productivity, wherein by the use of a particular chromatographic fractionation technique, the liquefaction and saccharification of starch are simplified; a glucose fraction with a glucose purity of at least 97% by weight ("purity" hereinafter denotes a percentage by weight which a starch sugar such as glucose accounts for of all starch sugars present), a maltose fraction with a maltose purity of at least 80% by weight, and an oligosaccharide fraction can be produced very efficiently in one operation; and all the fractions withdrawn can be made into marketable starch sugar products.

2. Description of the Prior Art

Glucose has conventionally been produced by liquefying starch milk with a liquefaction enzyme typified by α-amylase, saccharifying the liquefied starch with a saccharification enzyme typified by glucoamylase, subjecting the saccharified starch to purification steps such as filtration, decolorization, desalting and the like, and concentrating the resulting material. In order to produce glucose of high purity by this conventional process, the occurrence of oligosaccharides having polymerization degrees of 2 or more must be minimized during the liquefaction and saccharification steps. This requires strict control of the pH, temperature, salt concentration, reaction time, etc. in the enzymatic reactions and, in some cases, a debranching enzyme is also used in the saccharification step in order to minimize the occurrence of oligosaccharides of high polymerization degrees (the use of the debranching enzyme makes difficult the operation control). The purity of glucose industrially obtained by the above conventional process is considered to be about 97% by weight or less. When glucose is used for medicinal applications or for production of sorbitol (a starting material for vitamin C) requiring glucose having a purity higher than 97% by weight, it is a general practice to further purify, by crystallization, the glucose obtained by the above process, having a purity of about 97% by weight or less, and to use the resulting purer crystalline glucose for said applications.

In order to increase the glucose purity of the aqueous starch sugars solution with a glucose purity of about 97% by weight, obtained by the conventional process for liquefaction and saccharification, a method is known in which the portion other than glucose fraction is separated and removed as an oligosaccharide fraction by the use of a chromatographic separator of simulated moving bed type for fractionation into two fractions [Japanese Patent Application Kokai (Laid-Open) No. 83991/1991]. In this method, however, since the feed for chromatographic fractionation is an aqueous starch sugars solution with a high purity of glucose which is obtained only via the complicated liquefaction and saccharification steps of conventional technique, the simplification of the liquefaction and saccharification steps is impossible; moreover, since the chromatographic fractionation is fractionation into two fractions, it is impossible to separate at any high purity the maltose which is assumed to be present in the oligosaccharide fraction.

On the other hand, maltose has conventionally been produced by liquefying starch milk with a liquefaction enzyme typified by α-amylase, saccharifying the liquefied milk using, in combination, β-amylase and a debranching enzyme, subjecting the saccharified starch to purification steps such as filtration, decolorization, desalting and the like, and concentrating the resulting material. In order to produce maltose of high purity by this conventional process, the occurrence cf glucose and oligosaccharides having polymerization degrees of 3 or more must be minimized during the liquefaction and saccharification steps. This requires strict control of the pH, temperature, salt concentration, reaction time, etc. in the enzymatic reactions. Thus, while the above conventional process, when applied industrially, gives maltose having a purity of about 70–80% by weight, considerable technical and economic difficulties are encountered in order to obtain, by the process, maltose having a purity of 80% by weight or more.

In order to increase the maltose purity of the aqueous starch sugars solution containing maltose in a purity of about 70% by weight, obtained by the conventional process for liquefaction and saccharification, a process is known in which a maltose fraction is separated by the use of a chromatographic separator of simulated moving bed type for fractionation into two fractions (Japanese Patent Publication No. 51120/1987). In this process, however, since the feed for chromatographic fractionation is an aqueous starch sugars solution which is obtained only via the complicated liquefaction and saccharification steps of conventional technique, the simplification of the liquefaction and saccharification steps is impossible; moreover, since the chromatographic fractionation is fractionation into two fractions, it is impossible to separate each of glucose and oligosaccharides in a high purity.

In order to produce maltose of an increased purity from a solution containing maltose with a purity of about 80–90% by weight and further containing glucose and oligosaccharides, U.S. Patent Nos. 5,198,120 and 5,223,143 assigned to the assignee of the present application state a process for producing high-purity maltose by separating and removing fractions other than maltose fraction in the forms of a glucose-rich fraction and an oligossacharide-rich fraction using a chromatographic separator of simulated moving bed type capable of conducting fractionation into three or more fractions, at an efficiency far higher than that of the conventional chromatographic separator used for fractionation into two fractions (Example 2 of U.S. Patent No. 5,198,120 and Example 2 of U.S. Patent No. 5,223,143). This process enables fractionation into three fractions in one operation, thereby separating maltose at a high purity. However, the glucose fraction and the oligosaccharide fraction each contains other undesirable components, making it impossible to obtain high-purity glucose or high-purity oligosaccharides. Moreover, since the feed for chromatographic fractionation is a multi-component liquid in which maltose is highly concentrated only by the complicated liquefaction and saccharification steps, it is not possible to simplify the manufacturing process by doing without these complicated steps.

In each of the foregoing conventional processes, the product obtained is ordinarily high-purity glucose alone or high-purity maltose alone because the product is obtained by predominantly producing a target sugar with a minor amount of other sugars. Consequently, when glucose is produced, maltose and any other oligosaccharides become impurities and it is necessary to minimize the occurrence of oligosaccharides having molecular weights the same as or larger than maltose molecular weight, by strictly controlling the enzymatic reactions in the liquefaction and saccharification steps. Even by exercising such control, the maximum possible purity of glucose obtained is about 97% by weight. Hence, in order to obtain glucose of higher purity, the above-mentioned chromatographic fractionation or crystallization must have been used additionally.

When maltose is produced, glucose and oligosaccharides having molecular weights the same as or larger than maltotriose molecular weight become impurities and it is necessary to keep low the occurrence of glucose (a monosaccharide) and oligosaccharides having molecular weights the same as or larger than maltotriose molecular weight, by strictly controlling the enzymatic reactions in the liquefaction and saccharification steps. Even by exercising such control, the maximum purity of maltose industrially obtainable is about 80% by weight. Hence, in order to obtain maltose of higher purity, the above-mentioned chromatographic fractionation or crystallization must have been used additionally.

In the conventional chromatograhic separation process, since the fractionation efficiency is not sufficiently high, the intended component recovered is generally one component with the other components being impurities. Further, the feed for chromatographic fractionation is a solution wherein said intended component has been concentrated beforehand by some means so as to make it into a major component. Thus, it has been impossible at least industrially to obtain a plurality of fractions each containing a different component in a high purity, by the conventional chromatographic fractionation.

Of the hitherto proposed chromatographic separators, one considered to be most efficient is a chromatographic separator of simulated moving bed type comprising a plurality of columns which are packed with an adsorbent and which are connected by fluid paths (pipes) so as to form an endless serial circulation channel. In the conventional chromatographic separator of simulated moving bed type, however, separation of components is conducted merely by sequentially shifting the position for feeding the feed, the position for feeding the eluant and the positions for withdrawing eluates. Accordingly, the conventional simulated moving bed type separator is designed to separate a feed into two fractions. When fractionation of a feed into three fractions using such a separator is necessary, the fractionation must be conducted in two stages (two times), which is undesirable from the operational and cost standpoints.

As mentioned previously, there are disclosed a chromatographic separator of simulated moving bed type capable of fractionating a feed into three or more components in one operation and a fractionation process using the separator, in U.S. Patent No. 5,198,120 and U.S. Patent No. 5,223,143 both by the assignee of the present application. The feature of the chromatographic separator lies in that a shutoff valve is provided at a particular position of an endless serial circulation channel and a feed feeding path is connected with the circulation channel at one position just downstream of the shutoff valve, that is, the position for feeding the feed is not shifted and the circulation channel can be shut off as necessary. This chromatographic separator, however, has the following drawbacks. Although this separator is designed to fractionate a feed into three or more components, there is no actual case wherein the fraction each of glucose, maltose and oligosaccharides having higher polymerization degrees than maltose has been separated in a high purity. In Example 2 of each of the U.S. Patent Nos. 5,198,120 and 5,223,143, for instance, a case of separation of high-purity maltose is described as mentioned previously; however, the glucose fraction and the oligosaccharide fraction each contain other components, and neither high-purity glucose nor high-purity oligosaccharides are obtained. Further, since the feed for the chromatographic fractionation is a multicomponent solution wherein, the maltose concentration has been controlled at a high level beforehand by complicated liquefaction and saccharification steps, any simplification of the liquefaction and saccharification steps is no longer feasible.

SUMMARY OF THE INVENTION

The present invention has been made in view of the above-mentioned situation of the prior art and is intended to (1) produce, using a particular chromatographic separator, high-purity glucose and high-purity maltose efficiently in one operation from such a glucose- and maltose-containing mixture as is obtainable from a starch by liquefaction and saccharification wherein no strict control is required for the enzymatic reactions and (2 ) withdraw all fractions from said separator in such high purities as they can be made into marketable products.

The present invention resides in a process for production of starch sugars, wherein an aqueous starch sugars solution produced from starch is subjected to chromatographic fractionation to produce a glucose fraction with a glucose purity of at least 97% by weight, a maltose fraction with a maltose purity of at least 80% by weight and an oligosaccharide fraction in one operation, which process uses, as a feed to be fractionated, an aqueous starch sugars solution prepared by allowing a liquefaction enzyme to act on starch to produce liquefied starch, allowing saccharification enzymes for producing glucose and maltose to act on the liquefied starch to produce an aqueous starch sugars solution containing 10–50% by weight, based on the total solid content, of glucose, 30–50% by weight, also based on the total solid content, of maltose and oligosaccharides having molecular weights the same as or larger than maltotriose molecular weight, and concentrating the aqueous starch sugars solution so as to have a total solid content of 40–70% by weight, and which process further employs, for fractionation of a feed to be fractionated, a chromatographic separator capable of fractionating the feed into three or more fractions, constituted in such a way that a plurality of columns packed with an adsorbent, which is a cation exchange resin, are connected by fluid paths so as to form an endless serial circulation channel, that at each connection point between the columns, the feeding of an eluant and the withdrawal of an eluate fraction carl be conducted, that a shutoff valve is provided at a particular position of the circulation channel and that a feed feeding path is connected with the circulation channel just downstream of the shutoff valve, the operation of said chromatographic separator being comprised of a first step of closing the shutoff valve, feeding a feed or a feed and an eluant and simultaneously withdrawing a maltose fraction or a maltose fraction and an oligosaccharide fraction, and a second step of opening the shutoff valve, feeding the eluant alone without supplying the feed and simultaneously withdrawing an oligossacharide fraction and a glucose fraction while sequentially shifting the position for feeding the eluant and the positions for withdrawing the oligosaccharide fraction and the glucose fraction toward the downstream side of the circulation channel, thus the first and second steps accomplishing the chromatographic fractionation of said aqueous starch sugars solution as feed into at least the following three fractions:

a. a glucose fraction wherein the glucose is enriched to a purity of at least 97% by weight, b. a maltose fraction wherein the maltose is enriched to a purity of at least 80% by weight, and c. an oligosaccharide fraction wherein the oligosaccharides having molecular weights the same as or larger than maltotriose molecular weight are enriched.

In the present process, since a mixture containing glucose and maltose as main components is used as a feed for the chromatographic fractionation, the feed can be one which is prepared by the liquefaction and saccharification of starch without strict control for the enzymatic reactions of the starch. As a result, control of the liquefaction and saccharification steps can be greatly simplified and labor saving can be achieved. Further, the utility and equipment costs of the liquefaction and saccharification steps can be reduced. Moreover in the present process, the fractionation efficiency is high because a feed concentrated to a particular concentration is fractionated by a particular operation using a chromatographic separator of simulated moving bed type capable of carrying out fractionation into three or more components. As a result, although the purities of glucose, maltose and oligosaccharides in the feed are not high, it is possible to obtain a glucose fraction, a maltose fraction and an oligosaccharide fraction in one operation in such high purities as they can be made into marketable products.

In the present process, when in the first step the maltose fraction is withdrawn in two fractions of a maltose fraction wherein maltose is enriched, and a mixed fraction of glucose and maltose, with the maltose fraction withdrawn earlier and the mixed fraction withdrawn later, the first and second steps enable the chromatographic fractionation of the aqueous starch sugars solution as feed into the following four fractions:

a. a glucose fraction wherein the glucose is enriched to a purity of at least 97% by weight, b. a maltose fraction wherein the maltose is enriched to a purity of at least 80% by weight, b'. a mixed fraction of glucose and maltose, and c. an oligosaccharide fraction wherein the oligosaccharides having molecular weights the same as or larger than maltotriose molecular weight are enriched.

By withdrawing the maltose fraction in two portions, a maltose fraction with a vex high maltose purity can be obtained. Consequently, it becomes possible to obtain a glucose fraction with a glucose purity of 99.5% by weight or more, and/or a maltose fraction with a glucose purity of 1% by weight or less and with a maltose purity of 90% by weight or more (such a maltose fraction is very useful as a material for high-quality Japanese style confections, high-quality cakes, crystalline maltose for pharmaceutical use, etc.).

An oligosaccharide fraction can be obtained in a form containing glucose and maltose in a total purity as low as generally about 3% by weight or less, preferably about 1% by weight or less.

In the above process, the component purity in each fraction or the process efficiency can be increased by (1) after the preparation of the aqueous starch sugars solution, employing a filtration step for removal of impurities (e.g. oils and fats, proteins and suspended solids) and/or a purification step for deionization or softening, before the chromatographic fractionation, or (2 ) using a cation exchange resin of Na form or K form as an adsorbent in the chromatographic separator.

DETAILED DESCRIPTION AND THE PREFERRED EMBODIMENTS

Figure 1:
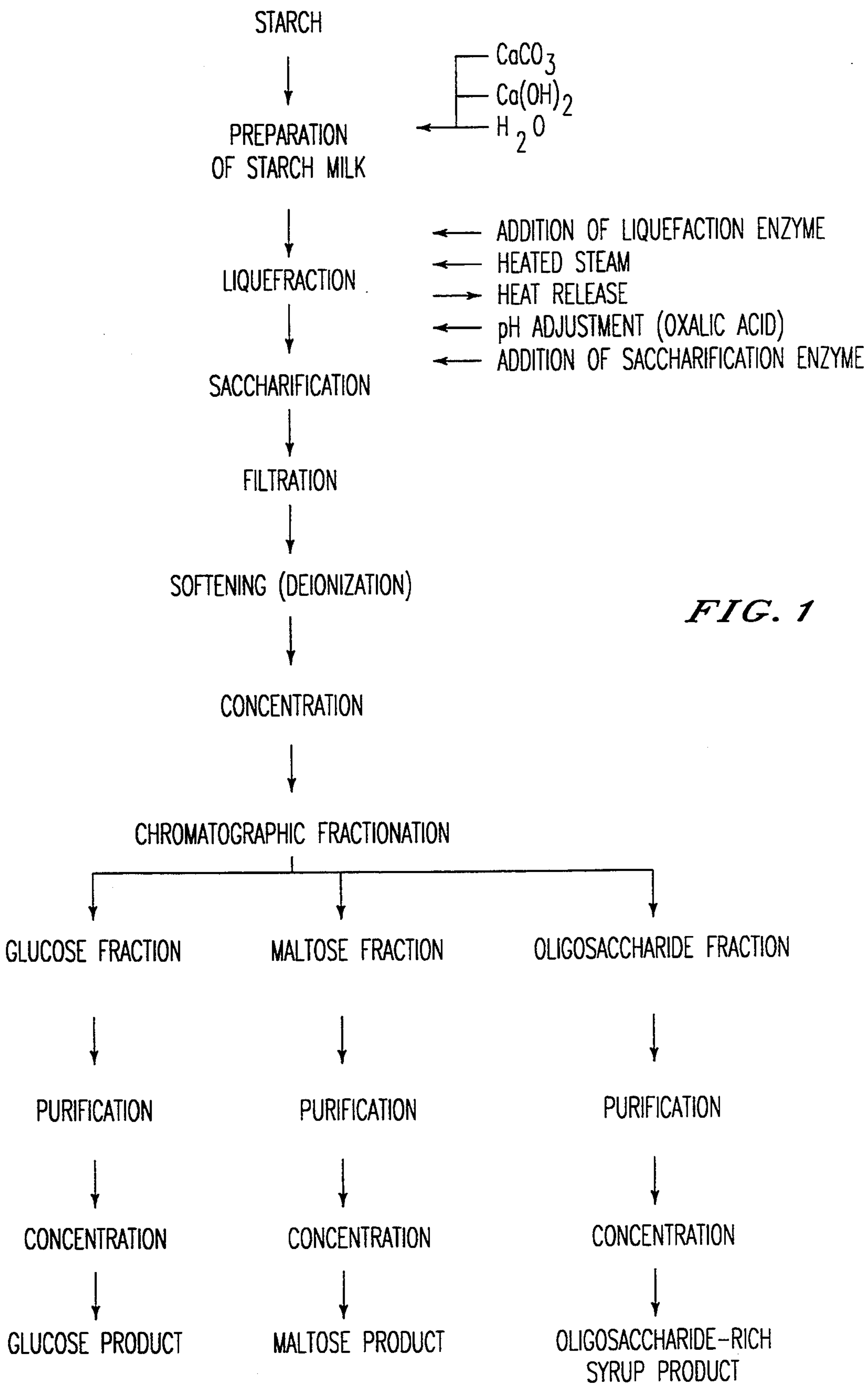
FIG. 1 is an illustration of an example (Example 1) of the production steps used in carrying out the process of the present invention.

The liquefaction and saccharification of starch can be conducted in various ways. In one typical way, starch such as corn starch, potato starch, tapioca starch, sweet potato starch or the like is mixed with $Ca(OH)_2$, $CaCO_3$ or the like and water to prepare starch milk; the starch milk is then reacted with a liquefaction enzyme such as α-amylase or the like at 100°–100° C. to accomplish liquefaction; after the liquefaction-enzume has been-deactivated, the pH and temperature of the liquefied starch are adjusted to 4.2°–4.6° and 56°–62° C., respectively, and then the liquefied starch is reacted with a plurality of saccharification enzymes including, for example, a combination of glucoamylase and β-amylase for saccharification into glucose and a saccharification enzyme for saccharification into maltose; thus, the starch is easily converted into an aqueous starch sugars solution containing glucose and maltose as main components and oligosaccharides having molecular weights the same as or larger than maltotriose molecular weight.

In the saccharification step, saccharification enzyme(s) for production of glucose and a saccharification enzyme for production of maltose may be allowed to act independently to conduct their reactions separately. However, in the present process, these enzymes are allowed to act simultaneously so that the saccharification step can be simplified because the saccharification step need not be strictly controlled in the present invention as compared with that of the prior art.

The aqueous starch sugars solution obtained by the above liquefaction and saccharification should better contain glucose and maltose as main components, i.e. glucose in a concentration of generally about 10–50% by weight (in terms of solid content), preferably about 30–50% by weight and maltose in a concentration of generally about 30–50% by weight, preferably about 30–40% by weight. The remaining components are mostly oligosaccharides having molecular weights the same as or larger than maltotriose molecular weight. When the glucose content is too low, it is difficult to obtain a glucose fraction having a sufficient glucose purity and, when the glucose content is too high, it is difficult to obtain a maltose fraction having a sufficient maltose purity. When the maltose content is too low, it is difficult to obtain a maltose fraction having a sufficient maltose purity and, when the maltose content is too high, it is difficult to obtain a glucose fraction having a sufficient glucose purity. The saccharification reaction is conducted so that the resulting aqueous starch sugars solution has the above-mentioned composition. In the conventional production of starch sugars, it was impossible to recover, from an aqueous starch sugars solution containing a plurality of components each in a concentration of 50% by weight or less, said components separately each in a high purity; therefore, it was necessary to control the saccharification reaction strictly and produce an aqueous starch sugars solution containing one intended component at a high concentration; this required considerable labor and equipment. Meanwhile in the saccharification of the present invention, it is not necessary to keep low the occurrence of glucose or oligosaccharides having molecular weights the same as or larger than maltose molecular weight, which permits, in the saccharification, the simple control of the saccharification reaction and affords labor saving. Further, the maltose content (concentration) in the aqueous starch sugars solution may be as low as 50% by weight or less, which requires no use of an expensive enzyme such as debranching enzyme or the like and results in lower utility costs. For example, while in the prior art the saccharification into glucose- or maltose-rich aqueous staunch sugars solution each required about 30–60 hours (i.e. 60–120 hours for both), in the present process the saccharification into an aqueous starch sugars solution relatively rich in both glucose and maltose is completed in about 20–50 hours and moreover no strict control for temperature, pH, etc. are necessary.

The aqueous starch sugars solution produced according to the present invention contains impurities such as oils and fats, proteins, suspended solids and the like. These impurities are removed by filtration using a filter such as diatomaceous earth filter or the like. The resulting solution is subjected to softening or deionization by use of ion exchange resin(s) or the like, to remove hardness components (e.g. Ca and Mg) which form a scale on an evaporator in a concentration step (described later) or contaminate an adsorbent used in a chromatographic fractionation step (described later), whereby a refined aqueous starch sugars solution is obtained. This aqueous starch sugars solution ordinarily has a solid content (concentration) of 25–35% by weight. The solution must be concentrated to a solid content suitable for chromatographic fractionation, i.e. 40–70% by weight, preferably 50–65% by weight, and the concentrated solution is subjected to chromatographic fractionation.

This solid content suitable for chromatographic fractionation has been found as a result of our research. When an aqueous starch sugars solution of low solid content is subjected to chromatographic fractionation, the amount of adsorbent required is large and, when a solution of high solid content is used, the efficiency of chromatographic fractionation drops or a large pressure loss across the adsorbent layer develops, which may lead to stoppage of the chromatographic operation.

The refined and concentrated aqueous starch sugars solution obtained as mentioned above is fractionated, by use of a chromatographic separator, into at least three fractions as mentioned earlier, whereby a glucose fraction of high purity and a maltose fraction of a high purity can be obtained easily. The glucose fraction and the maltose fraction are independently subjected to refining (e.g. decolorization and filtration) and then concentrated to obtain a high-purity glucose product and a high-purity maltose product. Needless to say, the thus obtained high-purity glucose and high-purity maltose may be, as necessary, further subjected to crystallization or chromatographic fractionation into products of higher purities.

The removal of hardness components from the aqueous starch sugars solution is generally conducted so that the resulting softened solution contains less than about 5 mg as $CaCO_3$, preferably 0 mg as $CaCO_3$ of hardness components per liter of said solution. The pH of the aqueous starch sugars solution is controlled generally at about 4–5.

As the chromatographic separator used in the present invention, it is necessary to use a chromatographic separator capable of fractionating a feed into three or more fractions efficiently. That is, in the present invention, it is necessary to use a chromatographic separator capable of fractionating a feed into three or more fractions, constituted in such a way that a plurality of columns packed with an adsorbent, which is a cation exchange resin, are connected by fluid paths so as to form an endless serial circulation channel, that at each connection point between the columns, the feeding of an eluant and the withdrawal of an eluate fraction can be conducted, that a shutoff valve is provided at a particular position of the circulation channel and that a feed feeding path is connected with the circulation channel just downstream of the shutoff valve. An example of such a chromatographic separaor is disclosed in the above-mentioned U.S. Patent Nos. 5,198,120 and 5,223,143 both by the assignee of the present application. Fractionation of feed into intended fractions using such a chromatographic separator is made by conducting a first step of closing the shutoff valve, feeding a feed or a feed and an eluant and simultaneously withdrawing a maltose fraction or a maltose fraction and an oligosaccharide fraction, and a second step of opening the shutoff valve, feeding the eluant alone without supplying the feed and simultaneously withdrawing an oligossacharide fraction and a glucose fraction while sequentially shifting the position fox feeding the eluant and the positions for withdrawing the oligosaccharide fraction and the glucose fraction toward the downstream side of the circulation channel, whereby the aqueous starch sugars solution as feed is fractionated into at least the following three fractions:

a. a glucose fraction wherein the glucose is enriched to a purity of at least 97% by weight, b. a maltose fraction wherein the maltose is enriched to a purity of at least 80% by weight, and c. an oligosaccharide fraction wherein the oligosaccharides having molecular weights the same as or larger than maltotriose molecular weight are enriched to a purity of at least 97% by weight.

In the first step, a maltose fraction having a medium affinity to the adsorbent, or this fraction and an oligosaccharide fraction having a weak affinity are withdrawn. In the second step, a glucose fraction having a strong affinity to the adsorbent and an oligosaccharide fraction having a weak affinity are withdrawn. The adsorbent suitable for the fractionation is a cation exchange resin of Na form or K form. In the present invention, since a chromatographic separator of simulated moving bed type having a shutoff valve and a feed feeding path provided just downstream thereof is used for improved fractionation efficiency, the first and second steps can be conducted efficiently. If a separator of low fractionation efficiency is used, it fails to produce a high-purity glucose fraction or a high-purity maltose fraction, or gives a very low productivity, and is impractical from the economical aspect.

In the present invention, the chromatographic fractionation may be conducted in various modifications. For example, it is possible to fractionate into at least the following four fractions:

a. a glucose fraction wherein the glucose is enriched to a purity of at least 97% by weight, b. a maltose fraction wherein the maltose is enriched to a purity of at least 80% by weight, b'. a mixed fraction of glucose and maltose, and c. an oligosaccharide fraction wherein the oligosaccharides having molecular weights the same as or larger than maltotriose molecular weight are enriched. By additionally withdrawing the fraction "b'", the glucose purity in the glucose fraction and the maltose purity in the maltose fraction can each be increased to an even higher level.

Incidentally, the mixed fraction "b'" contains glucose in a purity of about 10–25% by weight and maltose in a purity of about 70–85% by weight.

It is also possible to fractionate the feed into five or more fractions. In these cases, a plurality of mixed fractions such as fraction "b'" and the like are withdrawn in addition to the fractions "a", "b" and "c", whereby the glucose purity in the glucose fraction, the maltose purity in the maltose fraction and the oligosaccharide purity in the oligosaccharide fraction can each be increased to an even higher level.

Withdrawal of too many fractions, however, results in reduction in productivity. Hence, the number of fractions withdrawn is generally about 3–5, preferably about 3–4.

The number of columns constituting the circulation channel is appropriately determined depending upon the intended purities and yields of glucose, maltose and oligosaccharides in respective fractions, but is generally about 8–24, preferably about 8–12. Too small a number of columns gives low separability, and too large a number of columns entails a greater equipment cost.

Incidentally, in the above-mentioned U.S Patents, a feed containing maltose at a purity as high as about 80–90% by weight is fed into a chromatographic separator capable of conducting fractionation into three components, to obtain high-purity maltose, but neither high-purity glucose nor high-purity oligosaccharide is obtained. The reason is as follows. When a feed has a high glucose purity (in other words, the purity of other components in the feed are low), maltose must be recovered at a very high recovery ratio by preventing, as much as possible, maltose from mixing in with fractions of other components, thereby reducing the purity of other components. It is not economically feasible to provide any chromatogrpahic separator that can achieve such a high recovery of maltose. Hence, it is impossible to produce, in practice, glucose or oligosacchrides of high purity. In the present invention, chromatographic fractionation is conducted under particular operating conditions using a particular feed, whereby neither larger-sized separator nor longer operating time is necessary and all the fractions have such sufficient purities as they can be made into marketable products.

The fraction(s) other than the glucose fraction "a" and the maltose fraction "b", i.e. the fractions "c" and/or "b'", obtained in the chromatographic fractionation of the present invention may be returned to the liquefaction step for mixing with the starch milk to be liquefied, or to the saccharification step for hydrolysis into glucose and maltose (in the case of the oligosacchride fraction "c"), or may be concentrated and mixed with the feed to be subjected to chromatographic fractionation. However, the oligosaccharide fraction "c" or the mixed fraction "b'" of glucose and maltose is purified and concentrated to obtain an oligosaccharide-rich syrup product or a glucose-maltose mixed syrup product, or the mixed fraction "b'" of glucose and maltose is mixed with the oligosaccharide fraction "c" and the resulting mixture is purified and concentrated to obtain a maltose-rich syrup product, whereby the control of the process steps is simplified and the present process for the production of starch sugars becomes very efficient.

The present invention is hereinafter described more specifically by way of Examples. Needless to say, however, the present invention is not restricted to the Examples as long as the scope of the present invention is not impaired.

Figure 2:
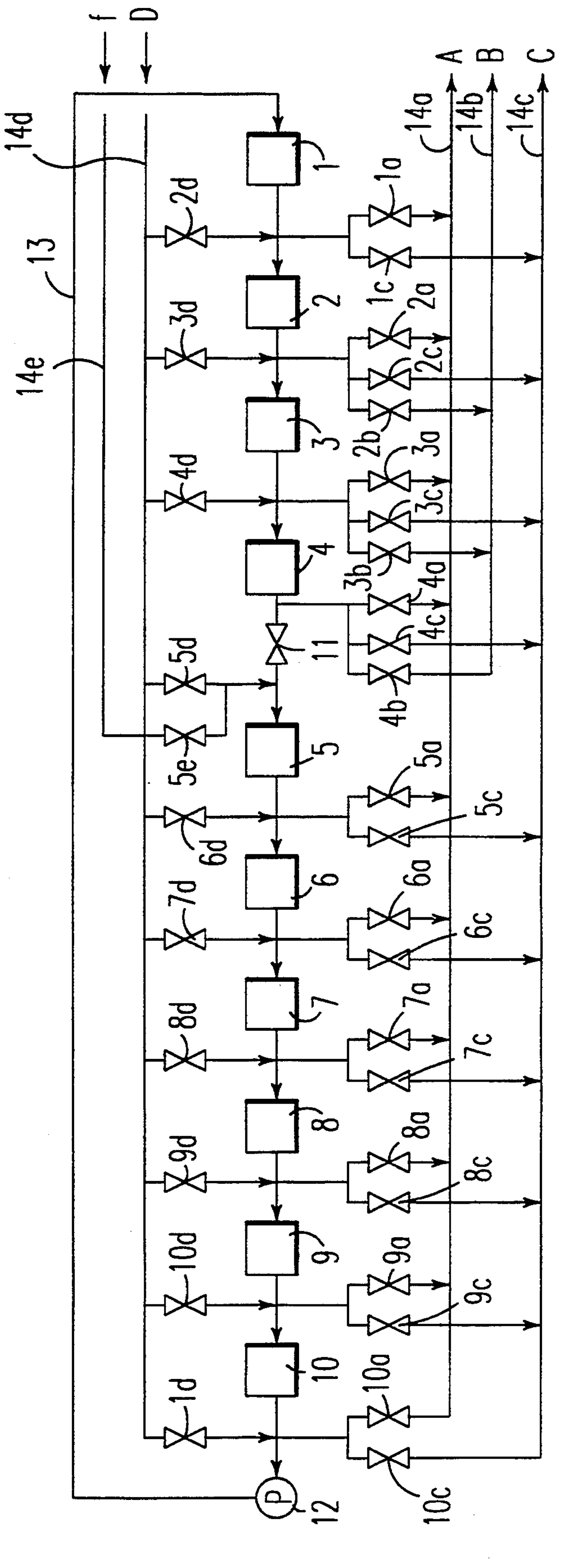
FIG. 2 is a schematic illustration of the structure of an example of the chromatographic separator used in the production steps of FIG. 1.

FIG. 1 is an illustration of an example of the production steps used in carrying out the process of the present invention, and FIG. 2 is a schematic illustration of the structure of an example of the chromatographic separator used in the production steps of FIG. 1.

In FIG. 2, (1) to (10) are each a column packed with the same adsorbent; each two adjacent columns of the columns (1) to (10) are connected by a pipe so as to enable the passage of a fluid therethrough; the back end of the last column (10) is connected with the front end of the first column (1) via a liquid path (13); a circulation pump (12) is provided on the fluid path (13); and a shutoff valve (11) is provided on the pipe between the columns (4) and (5) and is opened or closed by a control device not shown.

The pipe between the columns (4) and (5) is connected with a liquid feeding pipe downstream of the shutoff valve (11). This liquid feeding pipe is connected with a feed feeding path (**14*e*) (the feed is an aqueous starch sugars solution) via a feed feeding valve (5*e*) and also connected with an eluant feeding path (14*d*) (the eluant is water) via an eluant feeding valve (5*d*). The pipe between the columns (4) and (5) is further connected with a liquid withdrawal pipe, upstream of the shutoff valve (11). The liquid withdrawal pipe is divided into three branches so as to enable the withdrawal of three fractions each containing an enriched component. These three branches are connected with withdrawal paths (14*a*), (14*b*) and (14*c*) for a fraction of oligosaccharides having weak affinities to the adsorbent, a fraction of maltose having a medium affinity and a fraction of glucose having a strong affinity, respectively, via withdrawal valves (4*a*), (4*b*) and (4*c***) for the oligosaccharide fraction, the maltose fraction and the glucose fraction, respectively.

Each of the pipes between the columns (1) to (4), the pipes between the columns (5) to (10) and the pipe between the columns (10) and (1) is connected with the common eluant feeding path (**14*d*) mentioned previously, via eluant feeding valves (2*d*) to (4*d*), (6*d*) to (10*d*) and (1*d***). The opening or closing of the eluant feeding valves is conducted by a control device not shown, similarly to the case of the eluant feeding valve (*5d*) and the feed feeding valve (*5e*).

Each of the pipes between the columns (1) to (4), the pipes between the columns (5) to (10) and the pipe between the columns (10) and (1) is also connected with a liquid withdrawal pipe. Each of these liquid withdrawal pipes is divided into two or three branches and the branches are each connected with one of the above-mentioned withdrawal paths (14*a*), (14*b*) and (14*c*). That is, the pipe between the columns (1) and (2) is divided into two branches and connected with the oligosaccharide withdrawal path (14*a*) and the glucose withdrawal path (14*c*) via an oligosaccharide withdrawal valve, (1*a*) and a glucose withdrawal valve (1*c*), respectively; the pipes between the columns (2) to (4) are each divided into three branches and each connected with the oligosaccharide withdrawal path (14*a*), the maltose withdrawal path (14*b*) and the glucose withdrawal path (14*c*) via an oligosaccharide withdrawal valve (2*a*) or (3*a*), a maltose withdrawal valve (2*b*) or (3*b*) and a glucose withdrawal valve (2*c*) or (3*c*), respectively; and the pipes between the columns (5) to (10) and the pipe between the columns (10) and (1) are each divided into two branches and each connected with the oligosaccharide withdrawal path (14*a*) and the glucose withdrawal path (14*c*) via one of oligosaccharide withdrawal valves (5*a*) to (10*a*) and one of glucose withdrawal valves (5*c*) to (10*c*), respectively. The opening or closing of these withdrawal valves is conducted by a control device not shown, similarly to the withdrawal valves (4*a*), (4*b*) and (4*c*).

In the following Examples, each column of the chromatographic separator of FIG. 2 was packed with an adsorbent which was a strongly acidic cation exchange resin of Na form [Amberlite CG 6000 (trade name)]. Each of the 10 columns connected in series had an outside diameter of 108.3 mm and a length of 1,600 mm. The amount of the adsorbent packed in each column was 147.4 liters. Water was used as an eluant. Chromatographic fractionation was conducted with the temperature of each column kept at 60° C.

As mentioned previously, FIG. 2 is a schematic illustration of the structure of an example of the chromatographic separator used for carrying out the process of the present invention. It is experimentally possible to use, in place of the chromatographic separator of FIG. 2, two chromatographic separators of simulated moving bed type each for fractionation into two fractions and conduct fractionation in two stages; however, such fractionation is impractical from the economic standpoint. Hence, it is desirable to use a separator capable of conducting fractionation into three or more fractions efficiently in one operation, and any separator capable of conducting such fractionation can be used for the process of the present invention. While the separator of FIG. 2 uses 10 columns, the number of the columns can, of course, be varied depending upon the intended purities and yields of the glucose and maltose fractions to be obtained.

EXAMPLE 1

In the production steps shown in FIG. 1, a starch milk containing 33.8% by weight of corn starch was mixed with 0.4 kg, per kg of starch, of an enzyme (Termamyl 120L manufactured by NOVO) containing α-amylase as a main component. The mixture was adjusted to pH 6.6 and then kept at 105° for 5 minutes for a reaction. Then, the mixture was kept at 100° C. for 90 minutes to allow a liquefaction reaction to further proceed, followed by rapid cooling to 60° C. The resulting mixture was adjusted to pH 5.8 and mixed with 0.07 ml, per kg of starch, of glucoamylase (AMG 300L manufactured by NOVO) and 0.4 ml, per kg of starch, of β-amylase (Biozyme manufactured by Amano Pharmaceutical Co., Ltd.). The mixture was kept at 60° C. for 48 hours for saccharification, to obtain an aqueous starch sugars solution. The solution was filtered through diatomaceous earth and then passed through a cation exchange resin of Na form (15 liters) used for softening [Amberlite IR-120B (trade name) manufactured by Rohm and Haas] was charged into a column to a bed depth of 1 m to reduce the solution hardness from 199 mg (as $CaCO_3$)/liter to 0 mg (as $CaCO_3$)/liter. The resulting solution had a solid content of 30 (Brix). It was concentrated so as to have a solid content of 60 (Brix). The thus obtained aqueous starch sugars solution had a solid composition shown in Table 1 as determined by HPLC.

TABLE 1

| Solid content | Solid composition (wt. %) | | | |
|---|---|---|---|---|
| conc. (g/100 g) | Olicosaccharide | Maltose | Glucose | Others |
| 60.0 | 16.3 | 42.4 | 41.1 | 0.2 |

The aqueous starch sugars solution obtained as above was subjected to chromatographic fractionation in accordance with the operation sequence shown in Table 2, using an apparatus shown in FIG. 2, whereby fractions having the compositions shown in Table 3 were obtained. The fractions were subjected to refining (deionization and decolorization) and concentration [to a solid content of 65-75 (Brix)] as shown in FIG. 1, whereby a high-purity (99.6% by weight) glucose product, a high-purity (90.5% by weight) maltose product and an oligosaccharide-rich (purity: 97.6% by weight) syrup product were obtained in one chromatographic operation.

In Table 2, the sequence 1 corresponds to the first step of the chromatographic fractionation of the present invention and the sequences 2 to 10 correspond to the second step.

TABLE 2

| Sequence | Fed liquid | Withdrawn fraction | No. of open valve | Time (min) |
|---|---|---|---|---|
| 1 | Feed, water | Oligosaccharide fraction, maltose fraction | 5e, 8d, 6a, 4b | 15.0 |
| 2 | Water | Oligosaccharide faction, glucose fraction | 11, 9d, 7a, 10c | 8.6 |
| 3 | Water | Oligosaccharide fraction, glucose fraction | 11, 10d, 8a, 1c | 8.6 |
| 4 | Water | Oligosaccharide fraction, glucose fraction | 11, 1d, 9a, 2c | 6.0 |
| 5 | Water | Oligosaccharide fraction, glucose fraction | 11, 2d, 10a, 3c | 6.0 |
| 6 | Water | Oligosaccharide fraction, glucose fraction | 11, 3d, 1a, 4c | 6.0 |
| 7 | Water | Oligosaccharide fraction, glucose fraction | 11, 4d, 2a, 5c | 6.0 |
| 8 | Water | Oligosaccharide fraction, glucose fraction | 11, 5d, 3a, 6c | 6.0 |
| 9 | Water | Oligosaccharide fraction glucose fraction | 11, 6d, 4a, 7c | 6.0 |
| 10 | Water | Oligosaccharide fraction glucose fraction | 11, 7d, 5a, 8c | 6.0 |

TABLE 3

| Fraction | Solid content conc. (g/100 g) | Solid composition (wt. %) Oligosaccharide | Maltose | Glucose | Others |
|---|---|---|---|---|---|
| Oligosaccharide fraction | 5.1 | 98.7 | — | — | 1.3 |
| Maltose fraction | 15.9 | 6.8 | 86.2 | 6.9 | 0.1 |
| Glucose fraction | 13.7 | — | 0.1 | 99.9 | — |

In the chromatographic fractionation of the present Example, an oligosaccharide-rich fraction was withdrawn from the withdrawal valves (1*a*) to (10*a*); a maltose-rich fraction was withdrawn from the withdrawal valve (4*b*); and a glucose-rich fraction was withdrawn from the withdrawal valves (1*c*) to (8*c*) and (10*c*).

The flow rates in each sequence of the chromatographic fractionation were as shown below.

| | |
|---|---|
| Flow rates in sequence 1 | |
| Feeding rate of feed | 29.0 l/hr |
| Feeding rate of eluant | 86.4 l/hr |
| Withdrawal rate of oligosaccharide fraction | 13.8 l/hr |
| Withdrawal rate of maltose fraction | 101.6 l/hr |
| Flow rates in sequences 2-3 | |
| Feeding rate of eluant | 17.7 l/hr |
| Withdrawal rate of oligosaccharide fraction | 8.1 l/hr |
| Withdrawal rate of glucose fraction | 9.6 l/hr |
| Flow rate through adsorbent between position of eluant feeding and position of glucose fraction withdrawal | 56.7 l/hr |
| Flow rates in sequences 4-10 | |
| Feeding rate of eluant | 30.4 l/hr |
| Withdrawal rate of oligosaccharide fraction | 13.8 l/hr |
| Withdrawal rate of glucose fraction | 16.6 l/hr |
| Flow rate through adsorbent between position of eluant feeding and position of glucose fraction withdrawal | 81.1 l/hr |

The process of the present Example, as compared with the conventional process for producing high-purity glucose or high-purity maltose, was very easy to carry out, required no use of expensive enzyme (e.g. debranching enzyme), required less labor, was economical, and could produce a glucose product, a maltose product and an oligosaccharide-rich syrup product all of very high component purity in one chromatographic operation.

Incidentally, the production steps of FIG. 1 may be carried out in various modifications. For example, it is possible to use part or all of the oligosaccharide fraction for mixing into the starch milk before the liquefaction step, or to return to the saccharification step, or to recycle, after concentration, to the feed for chromatographic fractionation.

EXAMPLE 2

Figure 3:
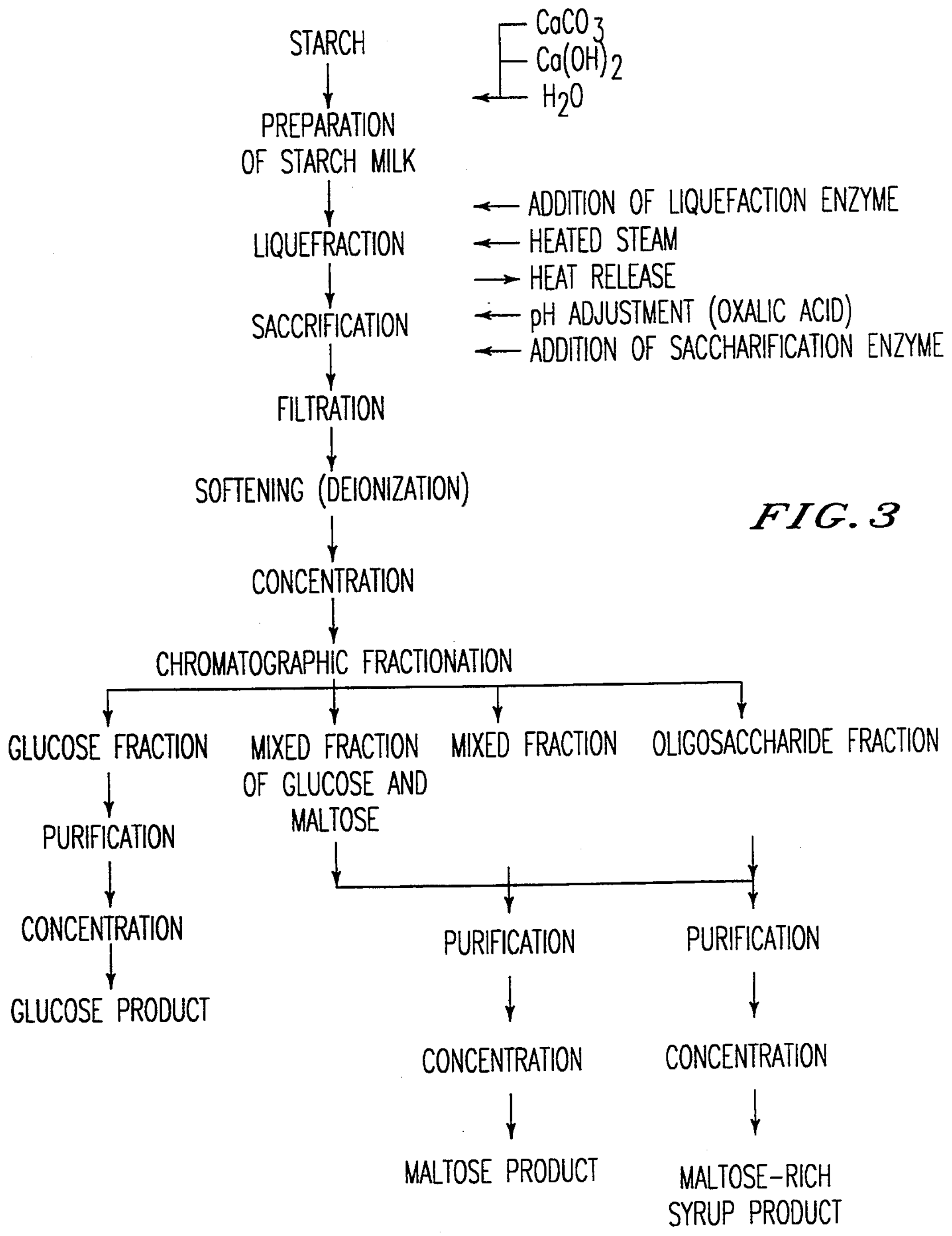
FIG. 3 is an illustration of other example (Example 2 ) of the production steps used in carrying out the process of the present invention.

In the production steps shown in FIG. 3 (the conditions used were the same as in Example 1 unless otherwise specified), a liquefaction enzyme containing α-amylase as a major component was used for the liquefaction; glycoamylase and β-amylase were used for the saccharification; and an aqueous starch sugars solution having the solid composition shown in Table 1 was obtained. This solution was subjected to chromatographic fractionation in accordance with the operation sequences shown in Table 4, using the same apparatus of FIG. 2 as used in Example 1, whereby fractions having the compositions shown in Table 5 were obtained. The oligosaccharide fraction and the mixed fraction of glucose and maltose were mixed into a maltose-rich syrup fraction shown in Table 6.

These fractions were subjected to refining (deionization and decolorization) and concentration [to a solid content of 65-75 (Brix)] to obtain a high-purity (99.6% by weight) glucose product, a high-purity (85.4% by weight) maltose product and a maltose-rich syrup product (the maltose and other oligosaccharides content was 95.4% by weight) in one chromatographic operation.

In Table 4, the sequences 1—1 and 1-2 correspond to the first step of the chromatographic fractionation of the present invention, and the sequences 2 to 10 correspond to the second step.

TABLE 4

| Sequence | Fed liquid | Withdrawn fraction | No. of open valve | Time (min) |
|---|---|---|---|---|
| 1-1 | Feed, water | Oligosaccharide fraction, maltose fraction | 5e, 8d, 6a, 4b | 9.5 |
| 1-2 | Feed, Water | Oligosaccharide fraction, mixed fraction of glucose and maltose | 5e, 8d 6a, 4b | 7.8 |
| 2 | Water | Oligosaccharide faction, glucose fraction | 11, 9d, 7a, 10c | 7.1 |
| 3 | Water | Oligosaccharide fraction, glucose fraction | 11, 10d, 8a, 1c | 7.1 |
| 4 | Water | Oligosaccharide fraction, glucose fraction | 11, 1d, 9a, 2c | 5.0 |
| 5 | Water | Oligosaccharide fraction, glucose fraction | 11, 2d, 10a, 3c | 5.0 |
| 6 | Water | Oligosaccharide fraction, glucose fraction | 11, 3d, 1a, 4c | 5.0 |
| 7 | Water | Oligosaccharide fraction, glucose fraction | 11, 4d, 2a, 5c | 5.0 |
| 8 | Water | Oligosaccharide fraction, glucose fraction | 11, 5d, 3a, 6c | 5.0 |
| 9 | Water | Oligosaccharide fraction glucose fraction | 11, 6d, 4a, 7c | 5.0 |
| 10 | Water | Oligosaccharide fraction glucose fraction | 11, 7d, 5a, 8c | 5.0 |

TABLE 5

| Fraction | Solid content conc. (g/100 g) | Solid composition (wt. %) Oligosaccharide | Maltose | Glucose | Others |
|---|---|---|---|---|---|
| Oligosaccharide fraction | 4.2 | 95.5 | 3.0 | 0.3 | 1.2 |
| Maltose fraction | 15.6 | 6.6 | 92.4 | 1.0 | — |
| Mixed fraction of glucose and maltose | 21.8 | 0.6 | 80.4 | 19.0 | — |
| Glucose | 14.7 | — | 0.3 | 99.7 | — |

TABLE 5-continued

| Fraction | Solid content conc. (g/100 g) | Solid composition (wt. %) Oligosaccharide | Maltose | Glucose | Others |
|---|---|---|---|---|---|
| fraction | | | | | |

TABLE 6

| Fraction | Solid content conc. (g/100 g) | Solid composition (wt. %) Oligosaccharide | Maltose | Glucose | Others |
|---|---|---|---|---|---|
| Maltose-rich syrup fraction | 8.6 | 35.6 | 51.9 | 12.1 | 0.5 |

In the chromatographic fractionation of the present Example, an oligosaccharide-rich fraction was withdrawn from the withdrawal valves (1*a*) to (10*a*); a maltose-rich fraction and a mixed fraction of maltose and glucose were withdrawn from the withdrawal valve (4*b*); and a glucose-rich fraction was withdrawn from the withdrawal valves (1*c*) to (8*c*) and (10*c*).

The flow rates in each sequence of the chromatographic fractionation were as shown below.

| | |
|---|---|
| Flow rates in sequence 1 | |
| Feeding rate of feed | 37.3 l/hr |
| Feeding rate of eluant | 58.4 l/hr |
| Withdrawal rate of oligosaccharide fraction | 24.9 l/hr |
| Withdrawal rate of maltose fraction or mixed fraction of glucose and maltose | 70.8 l/hr |
| Flow rates in sequences 2-3 | |
| Feeding rate of eluant | 26.9 l/hr |
| Withdrawal rate of oligosaccharide fraction | 14.5 l/hr |
| Withdrawal rate of glucose fraction | 12.4 l/hr |
| Flow rate through adsorbent between position of eluant feeding and position of glucose fraction withdrawal | 72.9 l/hr |
| Flow rates in sequences 4-10 | |
| Feeding rate of eluant | 46.1 l/hr |
| Withdrawal rate of oligosaccharide fraction | 24.9 l/hr |
| Withdrawal rate of glucose fraction | 21.2 l/hr |
| Flow rate through adsorbent between position of eluant feeding and position of glucose fraction withdrawal | 104.1 l/hr |

The process of the present Example, as compared with the conventional process for producing high-purity glucose or high-purity maltose, was very easy to carry out, required no use of expensive enzyme (e.g. debranching enzyme), required less labor, was economical, and could produce a glucose product, a maltose product and a maltose-rich syrup product all of very high component purity in one chromatographic operation.

Incidentally, the production steps of FIG. 3 may be carried out in various modifications. For example, it is possible to use part or all of the oligosaccharide fraction or the mixed fraction of glucose and maltose for mixing into the starch Milk before the liquefaction step, or to return to the saccharification step, or to recycle, after concentration, to the feed for chromatographic fractionation. Needless to say, the mixed fraction of glucose and maltose may be refined and concentrated to utilize as a low-purity maltose product.

What is claimed is:

1. A process for production of starch sugars, wherein an aqueous starch sugars solution produced from starch is subjected to chromatographic fractionation to produce a glucose fraction with a glucose purity of at least 97% by weight, a maltose fraction with a maltose purity of at least 80% by weight and an oligosaccharide fraction in one operation, which process uses, as a feed to be fractionated, an aqueous starch sugars solution prepared by allowing a liquefaction enzyme to act on starch to produce liquefied starch, allowing saccharification enzymes for producing glucose and maltose to act on the liquefied starch to produce an aqueous starch sugars solution containing 10–50% by weight, based on the total solid content, of glucose, 30–50% by weight, also based on the total solid content, of maltose and oligosaccharides having molecular weights the same as or larger than maltotriose molecular weight, and concentrating the aqueous starch sugars solution so as to have a total solid content of 40–70% by weight, and which process further employs, for fractionation of a feed to be fractionated, a chromatographic separator capable of fractionating the feed into three or more fractions, constituted in such a way that a plurality of columns packed with an adsorbent, which is a cation exchange resin, are connected by fluid paths so as to form an endless serial circulation channel, that at each connection point between the columns, the feeding of an eluant and the withdrawal of an eluate fraction can be conducted, that a shutoff valve is provided at a particular position of the circulation channel and that a feed feeding path is connected with the circulation channel just downstream of the shutoff valve, the operation of said chromatographic separator being comprised of a first step of closing the shutoff valve, feeding a feed or a feed and an eluant and simultaneously withdrawing a maltose fraction or a maltose fraction and an oligosaccharide fraction, and a second step of opening the shutoff valve, feeding the eluant alone without suppyling the feed and simultaneously withdrawing an oligossacharide fraction and a glucose fraction while sequentially shifting the position for feeding the eluant and the positions for withdrawing the oligosaccharide fraction and the glucose fraction toward the downstream side of the circulation channel, thus the first and second steps accomplishing the chromatographic fractionation of said aqueous starch sugars solution as feed into at least the following three fractions:

a. a glucose fraction wherein the glucose is enriched to a purity of at least 97% by weight, b. a maltose fraction wherein the maltose is enriched to a purity of at least 80% by weight, and c. an oligosaccharide fraction wherein the oligosaccharides having molecular weights the same as or larger than maltotriose molecular weight are enriched.

2. A process for production of starch sugars according to claim 1, wherein in the first step the maltose fraction is withdrawn in two fractions of a maltose fraction wherein maltose is enriched, and a mixed fraction of glucose and maltose, with the maltose fraction withdrawn earlier and the mixed fraction withdrawn later, thus the first and second steps accomplishing the chromatographic fractionation of the aqueous starch sugars solution as feed into the following four fractions:

a. a glucose fraction wherein the glucose is enriched to a purity of at least 97% by weight,
b. a maltose fraction wherein the maltose is enriched to a purity of at least 80% by weight,
b'. a mixed fraction of glucose and maltose, and
c. an oligosaccharide fraction wherein the oligosaccharides having molecular weights the same as or larger than maltotriose molecular weight are enriched.

3. A process for production of starch sugars according to claim 1 or 2, wherein after the chromatographic fractionation, the glucose fraction "a" and the maltose fraction "b" are purified and concentrated independently to obtain a glucose product and a maltose product, respectively.

4. A process for production of starch sugars according to claim 1 or 2, wherein after the chromatographic fractionation, the glucose fraction "a", the maltose fraction "b" and the oligosaccharide fraction "c" are purified and concentrated independently to obtain a glucose product, a maltose product and an oligosaccharide-rich syrup product, respectively.

5. A process for production of starch sugars according to claim 2, wherein after the chromatographic fractionation, the glucose fraction "a" and the maltose fraction "b" are purified and concentrated independently to obtain a glucose product and a maltose product, respectively, and the mixed fraction "b'" and the oligosaccharide fraction "c" are mixed, purified and concentrated to obtain a maltose-rich syrup product.

6. A process for production of starch sugars according to claim 1, wherein between the saccharification of the liquefied starch and the concentration of the resulting aqueous starch sugars solution, the aqueous starch sugars solution is subjected to refining steps of filtration for removal of oils, fats, proteins, suspended solids and other impurities, and deionization or softening.

7. A process for production of starch sugars according to claim 1, wherein the cation exchange resin as adsorbent is in the Na form or the K form and the eluant is water.

8. A process for production of starch sugars according to claim 1, wherein the saccharification of the liquefied starch is conducted in one step by allowing a saccharification enzyme for producing glucose and a saccharification enzyme for producing maltose to simultaneously act on the liquefied starch.

* * * * *

UNITED STATES PATENT AND TRADEMARK OFFICE

CERTIFICATE OF CORRECTION

PATENT NO. : 5,391,299

DATED : February 21, 1995

INVENTOR(S) : Takayuki MASUDA, et al.

It is certified that error appears in the above-indentified patent and that said Letters Patent is hereby corrected as shown below:

On the title page, Item [30], the Foreign Application Priority Number should read:

--5-047515--

Signed and Sealed this

Eighteenth Day of July, 1995

Attest:

BRUCE LEHMAN

Attesting Officer

*Commissioner of Patents and Trademarks*